United States Patent
Wall et al.

(10) Patent No.: US 12,353,945 B2
(45) Date of Patent: Jul. 8, 2025

(54) DETECTING EQUIPMENT STATE VIA TAG-READER MODULATIONS

(71) Applicant: United Parcel Service Of America, Inc., Atlanta, GA (US)

(72) Inventors: Patrick Wall, Atlanta, GA (US); Jeffrey Radaker, Atlanta, GA (US); Julian Bell, Decatur, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 18/391,149

(22) Filed: Dec. 20, 2023

(65) Prior Publication Data

US 2024/0220747 A1 Jul. 4, 2024

Related U.S. Application Data

(60) Provisional application No. 63/436,261, filed on Dec. 30, 2022.

(51) Int. Cl.
*G06K 7/08* (2006.01)
*G06K 7/10* (2006.01)

(52) U.S. Cl.
CPC ................ *G06K 7/10366* (2013.01)

(58) Field of Classification Search
CPC ........... G06K 7/10366; G06K 19/0723; G06K 19/0717; G06K 7/10415; G06K 17/0025
USPC ............................. 235/451, 492.46
See application file for complete search history.

(56) References Cited

U.S. PATENT DOCUMENTS

| | | | |
|---|---|---|---|
| 10,373,462 B2 * | 8/2019 | Oppenheimer ..... | G06K 19/0723 |
| 2005/0159835 A1 * | 7/2005 | Yamada ................. | G06Q 10/06 700/109 |
| 2007/0075143 A1 * | 4/2007 | Higashi ............. | G06K 19/0723 235/492 |
| 2007/0143853 A1 * | 6/2007 | Tsukamoto ............. | H04L 63/20 705/64 |
| 2014/0365640 A1 * | 12/2014 | Wohl ....................... | A41D 1/04 709/224 |
| 2015/0149250 A1 * | 5/2015 | Fein ..................... | H04W 4/029 705/28 |
| 2016/0328584 A1 * | 11/2016 | Rokhsaz ............ | G06K 7/10326 |
| 2019/0325173 A1 | 10/2019 | Tingler et al. | |

(Continued)

FOREIGN PATENT DOCUMENTS

| | | | | |
|---|---|---|---|---|
| JP | H091179902 | * | 7/1997 | ............. G06F 17/60 |
| WO | 9624210 | * | 8/1996 | ............. H04L 43/00 |
| WO | 2011/038018 A1 | | 3/2011 | |

OTHER PUBLICATIONS

European search report received for European Application No. 23220486.7, mailed on Apr. 29, 2024, 8 pages.

*Primary Examiner* — Daniel St Cyr
(74) *Attorney, Agent, or Firm* — Shook, Hardy & Bacon L.L.P.

(57) ABSTRACT

In general, various embodiments of the present disclosure provide systems, methods, apparatus, and technologies, and/or the like for generating predicted states of apparatus, equipment, items, and/or the like based at least in part on associated tag-reader modulations such as, for example, a presence of an RFID tag, an absence of an RFID tag, a combination of the two, and/or a metric of one or more reads of an RFID tag.

20 Claims, 6 Drawing Sheets

(56) References Cited

U.S. PATENT DOCUMENTS

2020/0117863 A1\* 4/2020 Ha .................. G06K 19/07771
2021/0198040 A1   7/2021 Gil et al.

\* cited by examiner

DETECTING EQUIPMENT STATE VIA TAG-READER MODULATIONS

CROSS REFERENCE TO RELATED APPLICATIONS

This application claims priority from U.S. Provisional Patent Application Ser. No. 63/436,261, filed Dec. 30, 2022, the disclosure of which is hereby incorporated herein by reference in its entirety.

BACKGROUND

In recent years, the proliferation of various sensor technologies has allowed for robust insights and inferences to be made across many enterprises and industries. For example, many enterprises and industries make use of technologies such as camera sensors, laser/photo eye sensors, radar, LIDAR, and/or the like to monitor manufacturing processes, and properties thereof, to ensure such processes are being carried out correctly. However, these sensor technologies often give rise to technical challenges with implementing these technologies as they can often require tedious configuration, installation, testing, and/or programming. Therefore, a need exists in the art for solutions that allow for such robust insights and inferences to made using technologies that do not necessarily require complex and/or technically challenging implementation.

SUMMARY

This summary is intended to introduce a selection of concepts in a simplified form that is further described below in the detailed description section of this disclosure. This summary is not intended to identify key or essential features of the claimed subject matter, nor is it intended to be used as an aid in isolation to determine the scope of the claimed subject matter.

In general, various embodiments of the present disclosure provide methods, apparatus, systems, computing devices, computing entities, and/or the like for generating predicted states of apparatus, equipment, items, and/or the like based at least in part on associated tag-reader modulations such as, for example, a presence of a tag, an absence of a tag, a combination of the two, and/or a metric of one or more reads of a tag. In various aspects of the disclosure a method is provided that comprises: receiving, by computing hardware, a request for a predicted state of an apparatus, wherein the request includes an apparatus identifier for the apparatus and a state identifier for the predicted state; identifying, by the computing hardware and based at least in part on the apparatus identifier and the state identifier, a reader device identifier and a tag identifier associated with the apparatus; querying, by the computing hardware and based at least in part on the reader device identifier and the tag identifier, tag read data, wherein the tag read data involves a reader device associated with the reader device identifier at least one of reading or not reading a tag associated with the tag identifier during a certain period of time; identifying, by the computing hardware and based at least in part on the state identifier, a set of rules, wherein the set of rules defines one or more predefined read characteristics associated with the reader device at least one of reading or not reading the tag that correspond to expected behavior for the apparatus; generating, by the computing hardware processing the tag read data using the set of rules, the predicted state of the apparatus; and communicating, by the computing hardware, the predicted state to at least one of a user computing device or a production computing system.

In some aspects, the one or more predefined read characteristics involve at least one of a presence or an absence of the tag during the certain period of time. In some aspects, the one or more predefined read characteristics involve a metric associated with reading the tag during the certain period of time satisfying a threshold. In some aspects, operations may be carried out based at least in part on the predicted state. For example, the production computing system, responsive to receiving the predicted state, may perform an operation involving the apparatus that causes a change of state of the apparatus.

In some aspects, the method may further comprise: identifying, by the computing hardware and based at least in part on the apparatus identifier and the state identifier, a second tag identifier associated with the apparatus; and querying, by the computing hardware and based at least in part on the reader device identifier and the second tag identifier, second tag read data, wherein: the second tag read data involves the reader device at least one of reading or not reading a second tag associated with the second tag identifier during the certain period of time, the one or more predefined read characteristics are also associated with the reader device at least one of reading or not reading the second tag that correspond to the expected behavior for the apparatus, and generating the predicted state of the apparatus also involves the computing hardware processing the second tag read data using the set of rules.

In some aspects, the method may further comprise: identifying, by the computing hardware and based at least in part on the apparatus identifier and the state identifier, a second reader device identifier associated with the apparatus; and querying, by the computing hardware and based at least in part on the second reader device identifier and the tag identifier, second tag read data, wherein: the second tag read data involves a second reader device associated with the second reader device identifier at least one of reading or not reading the tag during the certain period of time, the one or more predefined read characteristics are also associated with the second reader device at least one of reading or not reading the tag that correspond to the expected behavior for the apparatus, and generating the predicted state of the apparatus also involves the computing hardware processing the second tag read data using the set of rules.

In some aspects, the method may further comprise: identifying, by the computing hardware and based at least in part on the apparatus identifier and the state identifier, a second reader device identifier and a second tag identifier associated with the apparatus; and querying, by the computing hardware and based at least in part on the second reader device identifier and the second tag identifier, second tag read data, wherein: the second tag read data involves a second reader device associated with the second reader device identifier at least one of reading or not reading a second tag associated with the second tag identifier during the certain period of time, the one or more predefined read characteristics are also associated with the second reader device at least one of reading or not reading the second tag that correspond to the expected behavior for the apparatus, and generating the predicted state of the apparatus also involves the computing hardware processing the second tag read data using the set of rules.

In various other aspects of the disclosure, a system comprising a non-transitory computer-readable medium storing instructions and a processing device communicatively coupled to the non-transitory computer-readable medium is provided. The processing device is configured to execute the instructions and thereby perform operations comprising: receiving a request for a predicted state of an apparatus, wherein the request includes an apparatus identifier for the apparatus; identifying, based at least in part on the apparatus identifier, a reader device identifier and a tag identifier associated with the apparatus; querying, based at least in part on the reader device identifier and the tag identifier, tag read data, wherein the tag read data involves a reader device associated with the reader device identifier at least one of reading or not reading a tag associated with the tag identifier during a certain period of time; identifying a set of rules, wherein the set of rules defines one or more predefined read characteristics associated with the reader device at least one of reading or not reading the tag that correspond to expected behavior for the apparatus; processing the tag read data using the set of rules to generate the predicted state of the apparatus; and communicating the predicted state to at least one of a user computing device or a production computing system.

In some aspects, the one or more predefined read characteristics involve at least one of a presence or an absence of the tag during the certain period of time. In some aspects, the one or more predefined read characteristics involve a metric associated with reading the tag during the certain period of time satisfying a threshold. In some aspects, operations may be carried based at least in part on the predicted state. For example, the production computing system, responsive to receiving the predicted state, may perform an operation involving the apparatus that causes a change of state of the apparatus.

In some aspects, the operations may further comprise: identifying, based at least in part on the apparatus identifier, a second tag identifier associated with the apparatus; and querying, based at least in part on the reader device identifier and the second tag identifier, second tag read data, wherein: the second tag read data involves the reader device at least one of reading or not reading a second tag associated with the second tag identifier during the certain period of time, the one or more predefined read characteristics are also associated with the reader device at least one of reading or not reading the second tag that correspond to the expected behavior for the apparatus, and generating the predicted state of the apparatus also involves processing the second tag read data using the set of rules.

In some aspects, the operations may further comprise: identifying, based at least in part on the apparatus identifier, a second reader device identifier associated with the apparatus; and querying, based at least in part on the second reader device identifier and the tag identifier, second tag read data, wherein: the second tag read data involves a second reader device associated with the second reader device identifier at least one of reading or not reading the tag during the certain period of time, the one or more predefined read characteristics are also associated with the second reader device at least one of reading or not reading the tag that correspond to the expected behavior for the apparatus, and generating the predicted state of the apparatus also involves processing the second tag read data using the set of rules.

In some aspects, the operations may further comprise: identifying, based at least in part on the apparatus identifier, a second reader device identifier and a second tag identifier associated with the apparatus; and querying, based at least in part on the second reader device identifier and the second tag identifier, second tag read data, wherein: the second tag read data involves a second reader device associated with the second reader device identifier at least one of reading or not reading a second tag associated with the second tag identifier during the certain period of time, the one or more predefined read characteristics are also associated with the second reader device at least one of reading or not reading the second tag that correspond to the expected behavior for the apparatus, and generating the predicted state of the apparatus also involves processing the second tag read data using the set of rules.

In various other aspects of the disclosure, a non-transitory computer-readable medium storing computer-executable instructions is provided. The computer-executable instructions, when executed by computing hardware, configure the computing hardware to perform operations comprising: receiving a request for a predicted state of an apparatus, wherein the request includes an apparatus identifier for the apparatus; identifying, based at least in part on the apparatus identifier, a tag identifier associated with the apparatus; querying, based at least in part on the tag identifier, tag read data, wherein the tag read data involves a reader device at least one of reading or not reading a tag associated with the tag identifier during a certain period of time; processing the tag read data using a set of rules to generate the predicted state of the apparatus, wherein the set of rules defines one or more predefined read characteristics associated with the reader device at least one of reading or not reading the tag that correspond to expected behavior for the apparatus; and communicating the predicted state to at least one of a user computing device or a production computing system.

In some aspects, the one or more predefined read characteristics involve at least one of a presence or an absence of the tag during the certain period of time. In some aspects, the one or more predefined read characteristics involve a metric associated with reading the tag during the certain period of time satisfying a threshold. In some aspects, operations may be performed based at least in part on the predicted state. For example, the production computing system, responsive to receiving the predicted state, may perform an operation involving the apparatus that causes a change of state of the apparatus.

In some aspects, the operations may further comprise: identifying, based at least in part on the apparatus identifier, a second tag identifier associated with the apparatus; and querying, based at least in part on the second tag identifier, second tag read data, wherein: the second tag read data involves the reader device at least one of reading or not reading a second tag associated with the second tag identifier during the certain period of time, the one or more predefined read characteristics are also associated with the reader device at least one of reading or not reading the second tag that correspond to the expected behavior for the apparatus, and generating the predicted state of the apparatus also involves processing the second tag read data using the set of rules.

In some aspects, the operations may further comprise querying, based at least in part on the tag identifier, second tag read data, wherein: the second tag read data involves a second reader device at least one of reading or not reading the tag during the certain period of time, the one or more predefined read characteristics are also associated with the second reader device at least one of reading or not reading the tag that correspond to the expected behavior for the apparatus, and generating the predicted state of the apparatus also involves processing the second tag read data using the set of rules.

BRIEF DESCRIPTION OF THE DRAWINGS

The present systems, methods, and apparatus for providing artificial intelligence for generating packing recommendations for items are described in detail in connection with the attached drawing figures, which illustrate non-limiting examples of the disclosed subject matter, wherein.

DETAILED DESCRIPTION

Figure 1:
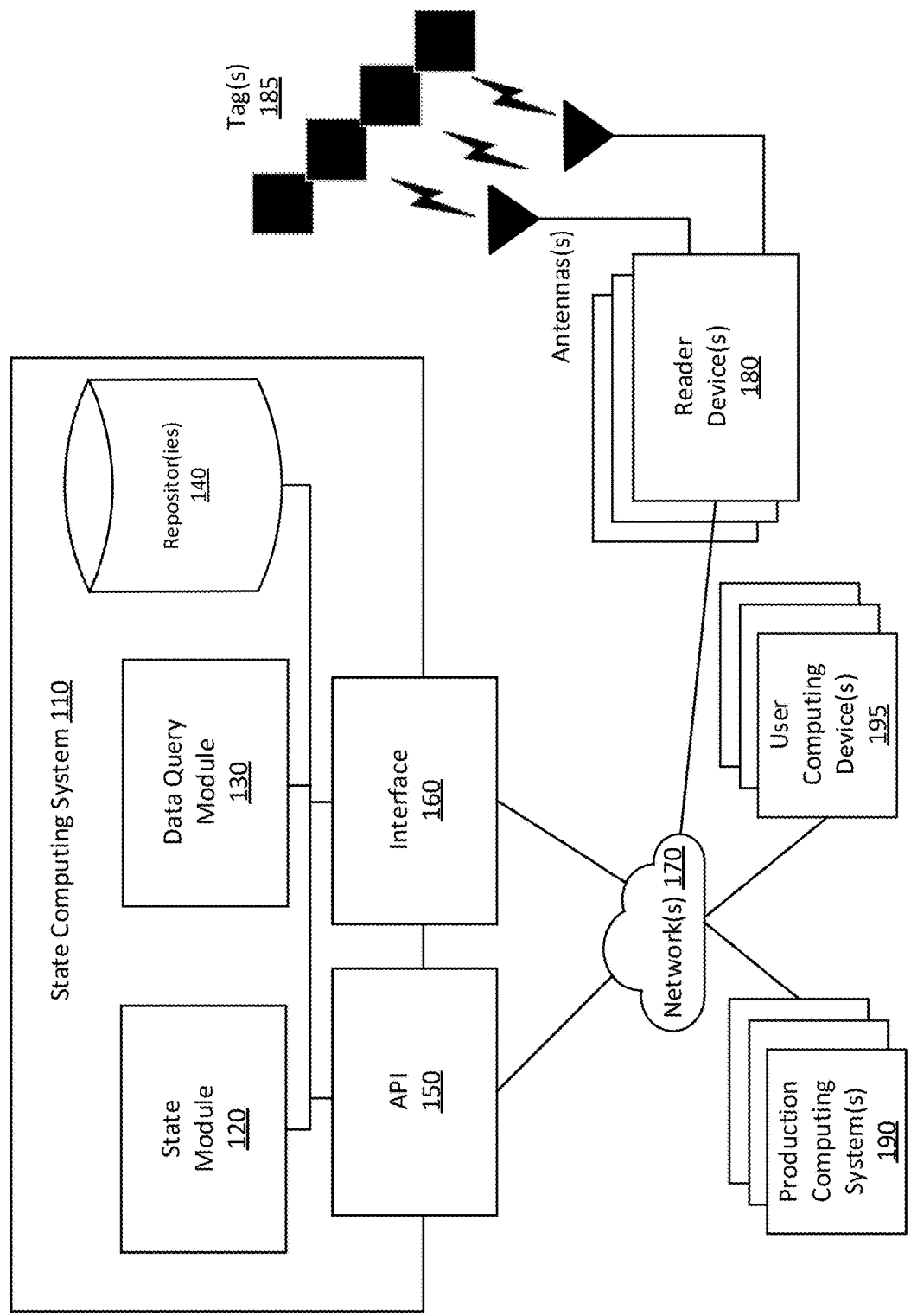
FIG. 1 depicts an example of a computing environment that can be used for generating predicted states of apparatus, equipment, items, and/or the like in accordance with various embodiments of the present disclosure.

This detailed description is provided in order to meet statutory requirements. However, this description is not intended to limit the scope of the disclosure. Rather, the claimed subject matter may be embodied in other ways, including different steps, different combinations of steps, different operations, different combinations of operations, different elements and/or components, and/or different combinations of elements and/or components, similar to those described in this disclosure and in conjunction with other present or future technologies and solutions. Moreover, although the term "Operation" may be used herein to identify different elements of methods employed, the term should not be interpreted as implying any particular order among or between different elements except when the order is explicitly described as such.

Overview

In recent years, the proliferation of various sensor technologies has allowed for robust insights and inferences to be made across many enterprises and industries. For example, many enterprises and industries make use of technologies such as camera sensors, laser/photo eye sensors, radar, LIDAR, and/or the like to monitor manufacturing processes, and properties thereof, to ensure such processes are being carried out correctly. As another example, many enterprises and industries make use of technologies such as accelerometers, gyroscopes, global positioning systems (GPS), and/or the like to monitor, detect, and/or track precise positioning of items and/or objects, such as mobile equipment, aircraft, employees, and/or the like.

However, these and other sensor technologies often give rise to technical challenges with implementing these technologies as they can often require tedious configuration, installation, testing, and/or programming. For example, the implementation of a camera sensor to automatically detect different objects traversing through a warehouse environment often requires the training of a model (e.g., a Convolutional Neural Network (CNN)) on thousands of human-labeled images, where millions of parameters (e.g., weights, coefficients) and hyperparameters (e.g., choice of loss function and number of hidden layers) must be configured to initiate or complete the training. As a result, the training of the model is often a highly complex process that, if carried out incorrectly, can lead to overfitting, underfitting, and/or the like, and a model that does not perform to an acceptable level of accuracy.

Accordingly, various embodiments of the disclosure overcome the technical challenges associated with the use of these various sensor technologies by instead using tag-reader-based technologies for providing robust insights and inferences across many enterprises and industries. For example, various embodiments of the disclosure involve the use of tag-reader-based technologies such as Radio Frequency Identification (RFID) technologies that generally do not require tedious configuration, installation, testing, and/or programming for implementation. RFID is a way to store and retrieve data through electromagnetic transmission to a Radio Frequency (RF) compatible integrated circuit. For example, an RFID reader device can read data emitted from an RFID tag via a defined radio frequency and protocol to detect a presence of some item associated with the RFID tag or to perform a simple trilateration of the item.

Particular embodiments described herein are directed to a state computing system configured for generating a predicted state of a machine, apparatus, item, and/or the like based at least in part on associated tag-reader modulations such as, for example, a presence of a tag, an absence of a tag, a combination of the two, and/or metrics of a read of the tag such as signal strength. In some embodiments, the state computing system may also generate a confidence score that provides a level of confidence in the predicted state of the machine, apparatus, item, and/or like.

A "machine," "apparatus," "item," and/or the like, as described herein, can be any component, article of manufacture, system, or any other suitable tangible item for which a state of the "machine," "apparatus," "item," and/or the like is to be monitored for some purpose. For convenience, the term "apparatus" is used throughout the remainder of the disclosure to represent the different types of components, articles of manufacture, systems, or any other suitable tangible items. For example, the state computing system of particular embodiments may be used in generating a predicted state of a cargo access door of a logistics vehicle as to whether the door is open or closed based at least in part on processing tag read data involving reads of a RFID tag associated with the door through a set of rules (e.g., conditional programming statements). As a specific example, the set of rules may define that a reader device recording a read of the RFID tag indicating a presence of the RFID tag over a certain period of time infers the door is open during the certain period of time. On the other hand, the set of rules may define that the reader device not recording a read of the RFID tag indicating an absence of the RFID tag over the certain period of time infers the door is closed during the certain period of time.

In operation, a reader device records reads of tags that may be associated with an apparatus or different apparatus. In general, the reader device reading a tag identifies a presence of the tag, while the reader device not reading the tag identifies an absence of the tag. For example, a RFID reader device typically transmits an interrogation signal with no specific tag as a target. If a given RFID tag is able to receive the interrogation signal because the tag is in range of the interrogation signal (distance), and the interrogation signal is not blocked by any absorbing or reflecting material ("visible/non-visible"), then the RFID tag provides a response that is captured and recorded by the RFID reader device as a read of the tag. In various embodiments, the RFID reader device's receipt of the response can be interpreted as a presence of the RFID tag. On the other hand, if the RFID tag is not in range of the interrogation signal and/or the interrogation signal is blocked by an absorbing or reflecting material, then the RFID tag does not provide a response that is captured by the RFID reader device. In various embodiments, the RFID reader device's lack of receiving a response from the RFID tag can be interpreted as an absence of the RFID tag.

A response received by the reader device may include various types of data such as, for example, a tag identifier for the tag that provided the response and/or various metrics associated with a read of the tag such as a signal strength of the response (e.g., a received signal strength indicator (RSSI) value), a phase angle measure of the response, and/or the like. In addition, the reader device may record additional data along with the response such as a reader device identifier for the reader device, a timestamp that the response was received, and/or the like.

Accordingly, various embodiments of the disclosure involve the use of tag-reader-based technologies, in lieu of various sensor technologies, in monitoring the state of an apparatus. For example, a carrier vehicle may be used by a package carrier (e.g., United Parcel Service, United States Post Office, and/or the like) in transporting parcels. The carrier vehicle may be backed up to a bay door of a sorting facility to have parcels loaded into and/or unloaded from the cargo space of the vehicle. The package carrier (e.g., personnel at the sorting facility) may be interested in monitoring the state of the cargo access door of the carrier vehicle as to whether the door is open or closed so that the package carrier is aware when loading and/or unloading of the cargo space of the vehicle has been completed and the vehicle can be removed from the bay door.

Conventional practice involves the package carrier installing some type of sensor technology to monitor the state of the door. For example, the package carrier may install some type of camera sensor at the bay door to monitor the state of the cargo access door. The package carrier may employee personnel who sit and monitor a screen coupled to the camera sensor to identify when the cargo access door has been open and closed to signal when to remove the carrier vehicle from the bay door. However, such practice often leads to an inefficient use of resources because the personnel is often solely dedicated to this task, and cannot be used in performing other tasks. Therefore, the package carrier may want to automate the monitoring of the cargo access door through the camera sensor so that personnel is not needed. However, such automation often requires a highly complex implementation of a model to use in conjunction with the camera sensor to detect the cargo access door being open and closed.

However, various embodiments of the disclosure address the technical challenges that can be encountered via conventional practices by using tag-reader-based technologies, instead of the camera sensor, in monitoring the state of the cargo access door as to whether the door is currently open or closed. A tag (e.g., an RFID tag) may be installed on the inside face of the cargo access door so that the tag is hidden when the door is closed. A reader device may be installed at the bay door. Therefore, when the carrier vehicle is backed up to the bay door and the cargo access door is swung open, the tag is exposed and is able to receive an interrogation signal being broadcast from the reader device. As a result, the tag provides one or more responses that are captured and recorded by the reader device.

In monitoring the current state of the cargo access door, the package carrier (e.g., production computing system thereof) may routinely (e.g., every two minutes) send a request to the state computing system to provide a predicted state of the door. For example, the request may include an apparatus identifier for the cargo access door and/or a state identifier for a state of open or closed. In turn, the state computing system may identify a reader device identifier for the reader device that is installed at the bay door based at least in part on the apparatus identifier and/or the state identifier. For example, the state computing system may query a data structure using the apparatus identifier to identify that the cargo access door (carrier vehicle) is currently located at the bay door. Additional, or alternatively, the state computing system may query the data structure, or some other data structure, using the state identifier to identify the reader device identifier for the reader device that has been installed at the bay door for the purpose of monitoring the state of cargo access doors of carrier vehicles.

The state computing system may then query tag read data based at least in part on the reader device identifier and the tag identifier. The tag read data involves the reader device located at the bay door at least one of reading or not reading the tag installed on the inside face of the cargo access door during a certain period of time. For example, the certain period of time may represent the previous two minutes of time.

In addition, the state computing system identifies a set of rules, based at least in part on the state identifier, that defines one or more predefined read characteristics associated with the reader device at least one of reading or not reading the tag that correspond to expected behavior for the cargo access door. For example, the set of rules may define that a presence of the tag indicates that the state of the cargo access door is open, while an absence of the tag indicates that the state of the cargo access door is closed.

In turn, the state computing system processes the tag read data using the set of rules to generate a predicated state of the cargo access door. In this instance, the cargo access door of the package vehicle has been open. Therefore, the tag read data queried for the certain period of time includes data that indicates that the reader device installed at the bay door has received one or more responses from the tag installed on the inside face of the cargo access door over the certain period of time. In other words, the tag read data indicates a presence of the tag installed on the inside face of the cargo access door over the certain period of time. Therefore, the state computing system generates a predicted state of open for the cargo access door. The state computing system may then communicate the predicted state to the package carrier (e.g., production computing system thereof).

Once the cargo area of the carrier vehicle has been loaded and/or unloaded and the cargo access door is closed, the tag is now hidden so that the tag is unable to receive the interrogation signal and discontinues providing responses to the reader device. The package carrier (e.g., production computing system thereof) may send another request to the state computing system to provide a predicted state of the door. This time, the state computing system may query tag read data that indicates that the reader device installed at the bay door has not received a response from the tag installed on the inside face of the cargo access door over the certain period of time. For example, the state computing system may query tag read data for the certain period of time that is null. Now, the tag read data indicates an absence of the tag installed on the inside face of the cargo access door over the certain period of time. As a result, the state computing system processes the tag read data using the set of rules and generates a predicted state of closed for the cargo access door, that the state computing system communicates to the package carrier (e.g., production computing system thereof).

The package carrier (e.g., production computing system thereof) may process the returned predicted states for the cargo access door and perform one or more operations. For example, the package carrier may process the returned predicted states and determine that the predicted state has changed from an open state to a closed state for the cargo access door over a particular period of time that would indicate that the cargo space of the carrier vehicle has been loaded and/or unloaded. The package carrier may then perform an operation to communicate to storage yard personnel to have the carrier vehicle removed from the bay door and have another carrier vehicle moved into the bay door.

In another example, the package carrier may process the returned predicted states for the cargo access door and determine that the cargo access door has been in an open state for an extended period of time (e.g., an hour) that would indicate that the door has been left open after the cargo space has been loaded and/or unloaded. The package carrier may then perform an operation to communicate to package loading personnel to have the personnel close the cargo access door of the carrier vehicle and have the vehicle removed from the bay door.

In various embodiments, the state computing system applies different set of rules that are defined for one or more predefined read characteristics that correspond to expected behaviors for different apparatus. The predefined read characteristics may be criteria or rules for different tag-reader modulations of a tag used for monitoring a given behavior (e.g., a given tag class). Generally speaking, a tag associated with an apparatus exhibits read characteristics that define specific modulations that correspond to specific expected behavior for the apparatus.

For example, a conveyor belt is expected to drive at varying speeds and objects (e.g., parcels) placed on top of the conveyor belt are expected to move along the conveyor belt at the same speed as the belt. Therefore, the state computing system may process tag read data using a set of rules defining read characteristics of a reader device in the vicinity of the conveyor belt reading a specific tag placed on the top of the conveyor belt at a particular time interval to infer (e.g., predict) a state that the conveyor belt is driving at a certain speed based at least in part on the particular time interval. As another example, a railing or landing pod used for servicing unmanned aerial vehicles (UAVs) is expected to be in contact with a UAV (e.g., have the UAV landed on the railing or landing pod) while servicing the UAV. Therefore, the state computing system may process tag read data using a set of rules defining read characteristics of a reader device coupled to the railing or landing pod reading a specific tag coupled to a UAV within a signal strength range (e.g., within a RSSI value range) to infer (e.g., predict) a state that the UAV has landed on the railing or landing pad.

Various embodiments of the disclosure improve upon the use of existing sensor-based technologies, such as camera sensors, laser/photo eye sensors, radar, LIDAR, accelerometers, gyroscopes, and/or the like, for monitoring purposes by using tag-reader-based components and functionality. Tag-reader-based technologies often do not require tedious configuration, installation, testing, and/or programming. Tags transmit identifying data (e.g., tag identifiers) and reader devices read the transmitted data by decoding the data. Such functionality and components generally only require minimal configuration or installation to ensure that a tag is emitting data and the reader device can read the tag without the need for extensive testing, programming, and/or model training. In addition, tags and reader devices are generally easy to install on any suitable surface. For example, a tag that has a size of 2×4 inches may include an adhesive flat surface that can be placed on any corresponding flat surface without the need for wires or other bulky equipment installation. Moreover, reader devices may already be implemented in environments to address material tracking challenges, making implementation of various embodiments of the disclosure easier. Further, various embodiments of the disclosure provide for novel functionality that improve tag-reader-based technologies. For example, various embodiments of the state computing system can provide novel functionality to allow for predicting the state of various apparatus that improves upon tag-reader-based technologies, in addition to the traditional tracking functionality provided by tag-reader-based technologies.

Example Computing Environment

FIG. 1 depicts an example of a computing environment 100 involved in using tag-reader-based technologies for generating and providing predicted states for apparatus in accordance with various embodiments of the present disclosure. In various embodiments, the computing environment 100 includes a state computing system 110 that provides a service for providing predicted states for various apparatus to production computing systems 190 that submit requests and/or individuals who submit requests for the predicted states. For example, the state computing system 110 may be associated with a particular entity, such as a manufacturer, that makes the service available to different production computing systems 190 of the entity so that the production computing systems 190 can submit requests for predicted states of different apparatus used within different operating processes, manufacturing processes, tracking processes, quality processes, and/or the like. The production computing systems 190 may use the predicted states in identifying and/or carrying out operations involving the different apparatus and/or processes.

Additionally, or alternatively, the state computing system 110 may make the service available to different individuals (e.g., management personnel) associated with the entity. For example, an individual can submit a request for a predicted state of an apparatus for the purpose of monitoring, tracking, reviewing, and/or the like the operation of the apparatus within a process.

The state computing system 110 may provide the service through different mechanisms. In some embodiments, the state computing system 110 may provide an application programming interface ("API") 150 through which calls can be made to submit requests for predicted states of different apparatus. For example, one or more production computing systems 190 may integrate computer-implemented functionality for submitting requests by installing the API 150 within the production computing system(s) 190 that can then be used to submit calls comprising the requests over one or more networks 170 (e.g., one or more of a Local Area Network (LAN), a Wide Area Network (WAN), the Internet, and/or the like that may include wired, wireless, fiber optic, and/or any combination thereof).

Additionally, or alternatively, the state computing system 110 may provide an interface 160 through which individuals can submit requests for predicted states of different apparatus. For example, the interface 160 may be a web application that individuals can access through a web browser on their user computing devices 195, such as personal computers, laptops, tablets, mobile devices, and/or the like, to submit requests for predicted states over one or more networks 170 (e.g., the Internet, cellular network, etc.). In another example, the interface 160 may be a software application, such as a mobile application, that users can install on their user computing devices 195 to submit requests for predicted states.

In various embodiments, the computing environment 100 includes one or more reader devices 180 configured for reading data from tags 185 associated with different apparatus. The reader device(s) 180 are generally responsible for interrogating or reading data emitted from and/or located on the tags 185. For example, the reader device(s) 180 may transmit (e.g., broadcast) an interrogation signal over a particular range (e.g., distance) and any tags 185 located within the range may send a response upon receiving the interrogation signal. Additionally, the reader device(s) 180 may write data to the tags 185.

A reader device 180 may be any suitable reader machine, manufacture, or module. For example, a reader device 180 may be an RFID reader, a near-field communication (NFC) reader, optical scanner, optical reader, bar code scanner, magnetic ink character recognition reader, beacon reader, and/or the like. The reader device 180 may be coupled to or placed in any suitable location, such as a particular distance, orientation, and/or height from, for example, a storage unit, on the ceiling of a building, on the floor of the building, on the wall of the building, and/or on any structure within a geographical area. In some embodiments, the reader device 180 may be handheld.

A tag 185 may be or include any suitable tag, machine, manufacture, module, and/or computer-readable indicia that is configured to be read by a reader device 180 by sending a response to the reader device 180. A tag 185 may be associated with an apparatus by attaching, or otherwise coupling, it to the apparatus or some other apparatus associated with the apparatus. The response may include different types of data such as a tag identifier for the tag 185, a classification for the tag 185, an apparatus identifier for an apparatus associated with the tag 185, and/or the like. In addition, the response may include metrics on the response such as a signal strength of the response, a phase angle of the response, and/or the like. Further, the tag 185 may comprise memory such as, for example, reserved memory, tag identifier (TID) memory, electronic product code (EPC) memory, user memory, and/or the like. For example, the tag 185 may be a RFID tag that includes an antenna and/or radio for transmitting and/or receiving the data and an RFID chip (e.g., an integrated circuit) for storing the data. Additionally, or alternatively, the tag 185 may be or include a paper label with a matrix or barcode with encoded data.

In particular embodiments, a reader device 180 and a tag 185 may be part of a system such as an RFID system that functions accordingly. RFID is a way to store and retrieve data through electromagnetic transmission to an RF compatible integrated circuit. An RFID reader device 180 can read data emitted from or located within an RFID tag 185. The RFID reader device 180 and tag 185 use a defined radio frequency and protocol to transmit or provide and/or receive data. An RFID tag 185 may be passive or active. A passive RFID tag 185 operates without a battery and responds to being interrogated by reflecting the RF signal transmitted to it from a reader device 180 and adding information by modulating the reflected signal. While an active tag 185 contains both a radio transceiver and a battery to power the transceiver. Since there is an onboard radio on the active tag 185, the tag 185 may have more range than a passive tag 185. In other embodiments, the reader device 180 and tag 185 need not be a part of an RFID protocol, but may alternatively or additionally be a part of another protocol such as Bluetooth low energy (BLE), bar codes, QR codes, and the like.

A reader device 180 may be independent of an apparatus or may be associated with one or more apparatus. For example, a reader device 180 may be installed in a specific area of the facility for the general purpose of interrogating any tags 185 that enter into the specific area of the facility. In another example, a reader device 180 may be installed in a facility for the sole purpose of monitoring the state of a particular apparatus found within the facility.

Upon receiving responses from tags 185, the reader device(s) 180 in various embodiments record the responses to one or more repositories 140. For example, the repository(ies) 140 may be a part of (e.g., reside within) the state computing system 110. Here, the reader device(s) 180 may be in communication with the state computing system 110, and corresponding repository(ies) 140, over one or more networks 170. For example, the state computing system 110 may provide an API 150 through which the reader device(s) 180 can communicate with the repository(ies) 140 and store responses in the repository(ies) 140.

Additionally, or alternatively, the state computing system 110 may use the repository(ies) 140 for storing additional data such as different sets of rules that are applicable for monitoring behavior of different apparatus. In addition, the state computing system 110 may use the repository(ies) 140 for storing data structures (e.g., tables) that map relationships between reader device(s) 180 and tags 185 (e.g., identifiers thereof), reader device(s) 180 and apparatus (e.g., identifiers thereof), tags 185 and apparatus (e.g., identifiers thereof), tags 185 and classifications, and/or the like.

In particular embodiments, the state computing system 110 executes a state module 120 to generate a predicted state of an apparatus. Accordingly, the state computing system 110 may include hardware components for executing the state module 120. As discussed further herein, the state module 120 is configured to receive a request for a predicted state of an apparatus and process the request to generate the predicted state. In doing so, the state module 120 may identify one or more reader device(s) 180 and/or one or more tag(s) 185 associated with the apparatus and query tag read data for the reader device(s) 180 and/or tag(s) 185 that the state module 120 uses in generating a predicted state for the apparatus. In some embodiments, the state module 120 executes a data query module 130 for querying the tag read data needed in generating the predicted state for the apparatus. Additional detailed is now provided on the functionality of the state module 120 and the data query module 130 according to various embodiments of the disclosure.

State Module

Figure 2:
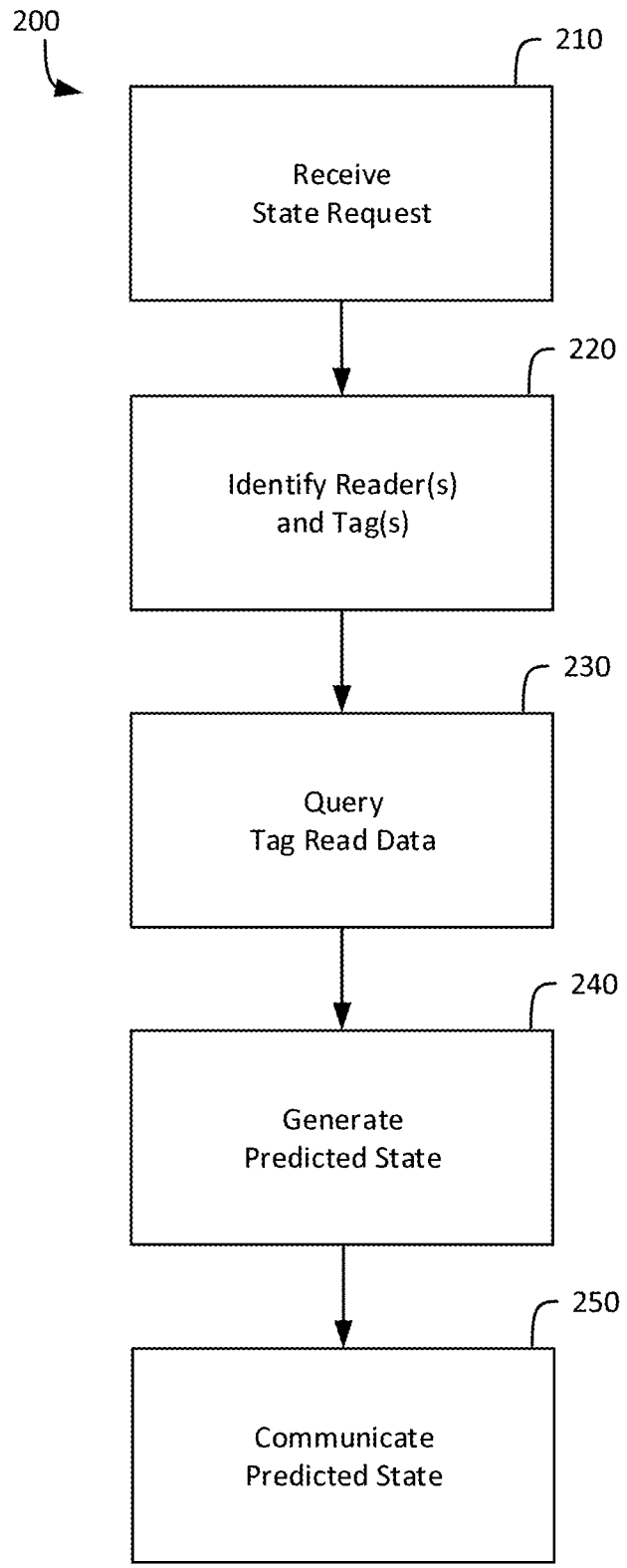
FIG. 2 depicts an example of a process for generating a predicted state for an apparatus, equipment, item, and/or the like in accordance with various embodiments of the present disclosure.

Turning now to FIG. 2, additional details are provided regarding a state module 120 for generating and providing a predicted state for an apparatus in accordance with various embodiments of the disclosure. For instance, the flow diagram shown in FIG. 2 may correspond to operations carried out, for example, by computing hardware found in the state computing system 110 as described herein, as the computing hardware executes the state module 120.

The process 200 involves the state module 120 receiving a request for a predicted state of an apparatus at Operation 210. For example, the state computing system 110 may receive the request from a production computing system 190 or a user computing device 195 through which an individual has submitted the request. Depending on the embodiment, the request may include different types of data. For example, the request may include an apparatus identifier for the apparatus. Additionally, or alternatively, the request may include a state identifier that identifies the particular state of interest that is being requested.

For example, an entity may be interested in monitoring multiple states for a particular apparatus such as a conveyor belt. Specifically, the entity may be interested in monitoring whether the conveyor belt is currently operating (e.g., whether the conveyor belt is on or off), as well as the speed at which the conveyor belt is operating. Therefore, the request may include a state identifier that identifies whether the entity is interested in a predicted state with respect to whether the conveyor belt is currently operating or a predicted state with respect to the speed at which the conveyor belt is operating.

Further, the request may identify a certain period of time for which the predicted state of the apparatus is requested. For example, the request may identify that the predicted state for the apparatus is requested for near real-time, the previous two minutes of time, the previous half hour of time, and/or the like. Accordingly, the state module 120 may evaluate the tag read data for appropriate tags over the certain period of time.

At Operation 220, the state module 120 identifies the one or more reader device(s) 180 and/or one or more tag(s) 185 associated with the apparatus and/or requested state. In some embodiments, the state module 120 performs this particular operation by querying a data structure using the apparatus identifier and/or state identifier to identify reader device identifies) and/or tag identifier(s) for the reader device(s) and/or tag(s) involved with monitoring the requested state for the apparatus. For example, the data structure may be a table that includes records that map apparatus identifiers and/or state identifiers to reader device identifiers and/or tag identifiers. Therefore, the state module 120 queries the data structure using the apparatus identifier and/or state identifier to obtain the reader device identifier(s) and/or tag identifier(s) for the reader device(s) and/or tag(s) used in monitoring the requested state for the apparatus.

In some embodiments, the data structure may include a classification for each of the reader devices 180 and/or tags 185 so that the state module 120 is able to identify those reader device identifiers and/or tag identifiers that are applicable to the requested state. For example, the requested state may involve the operational state of the apparatus (e.g., whether the apparatus is running or not). Therefore, the state module 120 may identify the reader device(s) 180 and/or the tag(s) 185 (identifiers thereof) associated with the apparatus with a classification of "operation." If the requested state is not known (e.g., the request does not include a state identifier), then the state module's 120 query of the data structure may also return the classification along with the reader device identifier(s) and/or tag identifier(s). The classification may then serve as the state identifier for purposes of further processing of the request.

At Operation 230, the state module 120 queries tag read data for the one or more combinations of reader device(s) 180 and tag(s) 185 that is applicable to predicting the requested state for the apparatus. In particular embodiments, the state module 120 performs this operation by executing a data query module 130. For example, the state module 120 may identify a single reader device 180 and two tags 185 that are associated with the apparatus and/or requested state. Therefore, the state module 120 may execute the data query module to query tag read data that involves reads of the two tags 185 (e.g., responses received from the two tags 185) made by the single reader device 180 during the certain period of time (e.g., during the previous two minutes of time). In turn, the data query module 130 queries the tag read data and returns the tag read data to the state module 120.

For example, the tag read data may indicate that one of the two tags 185 was read by the reader device 180 during the certain period of time. That is to say, the tag read data may indicate a presence of one of the two tags 185 during the certain period of time. Additionally, or alternatively, the tag read data may indicate that one of the two tags 185 was not read by the reader device 180 during the certain period of time. That is to say, the tag read data may indicate an absence of one of the two tags 185 during the certain period of time. Additionally, or alternatively, the tag read data may indicate one or more metrics associated with a read of one of the two tags 185. For example, the tag read data may include a signal strength of a response received from one of the two tags 185 involved in a read of the tag by the reader device 180.

At Operation 240, the state module 120 generates the predicted state for the apparatus. In various embodiments, the state module 120 performs this operation by identifying a set of rules that is applicable to the predicted state based at least in part on the state identifier. At noted, the state identifier may have been provided in the request or the state identifier may be a classification associated with at least one of the identified reader device(s) 180 and/or tag(s) 185. If the identified reader device(s) 180 and/or tag(s) 185 are associated with multiple classifications, then the state module 120 may identify multiple sets of rules and generate multiple predicted states for the apparatus. However, for the purposes of this disclosure, the request involves a single state of the apparatus, and the state module 120 identifies a single set of rules.

In various embodiments, the set of rules defines one or more predefined read characteristics associated with a reader device 180 reading and/or not reading a tag that correspond to expected behavior for the apparatus. The predefined read characteristics may be criteria or rules for different tag-reader modulations of a tag used for monitoring a given behavior (e.g., a given tag class). Generally speaking, a tag associated an apparatus exhibits read characteristics that define specific modulations that correspond to specific expected behavior for the apparatus.

For example, a read characteristic may be a presence or an absence of one or more tags 185 that corresponds to a specific expected behavior for the apparatus. A read characteristic may be an observed data pattern of reading and/or not reading one or more tags 185 that corresponds to an expected behavior for the apparatus. For example, a read characteristic may be a pattern of a presence of a tag 185, followed by an absence of the tag 185, followed by another presence of the tag 185 that corresponds to an expected behavior of the apparatus. A read characteristic may be an observed metric of a read of one or more tags 185 that corresponds to an expected behavior of the apparatus. For example, a read characteristic may be a phase angle measurement of a read of a tag 185 satisfying a threshold that correspond to an expected behavior of the apparatus.

An expected behavior is an expected state that an apparatus is exhibiting or can exhibit. For example, a door can exhibit a first expected behavior of being in an open position and exhibit a second expected behavior of being in a closed position. As another example, a conveyor belt assembly can exhibit a first expected behavior of rotating at various speeds or speed ranges and can exhibit a second expected behavior of being in a stopped state.

In various embodiments, the state module 120 processes the tag read data using the set of rules to generate the predicted state for the apparatus. More specifically, the state module 120 analyzes and/or compares the tag read data with the one or more predefined read characteristics to determine an inference that the apparatus is exhibiting a particular expected behavior (e.g., is in a particular state). For example, the set of rules may define a rule for a tag 185 that is a Boolean value of "Read=True" to represent a presence of the tag 185 during the certain period of time infers the apparatus is exhibiting a certain expected behavior. As another example, the set of rules may define a rule for a tag 185 that is a conditional statement of "IF RSSI=>X" to represent a condition of a metric of a read of the tag 185 during the certain period of time satisfying a threshold infers the apparatus is exhibiting a certain expected behavior.

In some embodiments, the set of rules may comprise a machine learning model that generates the predicted state as a classification, a member of a cluster, and/or the like. For example, the state module 120 may convert or encode the tag read data, or portion thereof, into a feature vector and process the feature vector using the machine learning model to determine a distance (e.g., Euclidian or Cosine) to a nearest vector is in a vector space to the feature vector. Here, the nearest vector may correspond to a particular predicted state. As an illustrative example, the machine learning model may learn over various training iterations that when a read of a tag 185 associated with a conveyor belt occurs at a specific time interval, it corresponds to a particular speed of the conveyor belt. Accordingly, the state module 120 may process the tag read data, or portion thereof, using the machine learning model for an instance in which the tag read data, or portion thereof, indicates a read of the tag during the certain time period occurred at (or within a threshold time of) the specific time interval, and the machine learning model may generate a predicted state that the conveyor belt is rotating at the particular speed.

Depending on the embodiment, the state module 120 may represent the predicted state for the apparatus in different formats. For example, the state module 120 may represent the predicted state in the format of a classification. As an illustrative example, the request may involve a predicted state for a status of a bulkhead door. Here, the state module 120 may represent the predicted state as a classification of either "open" or "closed." As another illustrative example, the request may involve a predicted state for a current operation of a conveyor belt. Here, the state module 120 may represent the predicted state as a classification of either "on" or "off."

Additionally, or alternatively, the state module 120 may represent the predicted state as a reply to a question. As an illustrative example, the request may involve a question as to whether a bulkhead door is open. Here, the state module 120 may represent the predicted state as a reply of either "yes" or "no." Additionally, or alternatively, the state module 120 may represent the predicted state as a numeric, an alphanumeric, and/or the like. As an illustrative example, the request may involve a question as to whether a conveyor is operating. Here, the state module 120 may represent the predicted state as a numeric (e.g., a value) on a sliding scale of zero to one-hundred. A value of zero may indicate a very high confidence that the conveyor is not operating. A value of one-hundred may indicate a very high confidence that the conveyor is operating. A value of fifty may indicate a neural confidence that the conveyor is operating. In other words, a value of fifty may indicate that the state module 120 is indeterminate as to whether the conveyor is operating or not.

In some embodiments, the state module 120 may provide a confidence score along with the predicted state that represents a confidence in the predicted state being correct. For example, the state module 120 may provide a confidence score between zero and one with a score of zero indicating the state module 120 has a very low confidence in the predicted state and a score of one indicating the state module 120 has a very high confidence in the predicted state.

At Operation 250, the state module 120 communicates the predicted state to the entity that submitted the request. For example, the state module 120 may communicate the predicted state to a production computing system 190 that submitted the request and/or a user computing device 195 of an individual who submitted the request. In some embodiments, the entity may perform one or more operations based at least in part on the predicted state.

For example, a production computing system 190 may be configured to monitor a painting production line for an automotive manufacturer. The painting production line may include a quality control monitoring system that monitors the surface finish of painted exteriors of vehicles to ensure that the paint has been applied correctly. Upon the painting production line being started, the production computing system 190 may send a request to the state computing system 110 to provide a predicted state for the quality control monitoring system as to whether the quality control monitoring system is currently operating.

Here, the quality control monitoring system may include a surface sensor with a cover that closes during times when the quality control monitoring system is not operating so that the surface sensor is protected from damage. A tag 185 may be attached to the inside surface of the cover that faces the surface sensor when the cover is closed. A reader device 180 may be installed at or on the quality control monitoring system to monitor for a presence of the tag 185. When the cover is closed, the tag 185 is hidden from the interrogation signal of the reader device 180 and is absent from detection by the reader device 180. When the cover is open, the tag 185 becomes exposed to the interrogation signal and the tag 185 becomes present for detection by the reader device 180.

Accordingly, the state computing system 110 may execute the state module 120 and have the state module generate a predicted state of either "operating" or "not operating," that is then returned to the production computing system 190. Based as least in part on the predicted state, the production computing system may then perform one or more operations with respect to the quality control monitoring system. For example, if the predicated state is "not operating," then the production computing system may perform an operation to change the state of the quality control monitoring system from not operating to operating by automatically turning on the system.

Therefore, in particular embodiments, the state computing system 110, and state module 120 thereof, can assist the production computing system 190 in ensuring the quality control monitoring system is up and running when the painting production line is operating and painting vehicles. Further, in particular embodiments, the state computing system 110, and state module 120 thereof, can do so using tag-reader-based technologies that often do not require tedious configuration, installation, testing, and/or programming, unlike many sensor-based technologies.

Data Query Module

Figure 3:
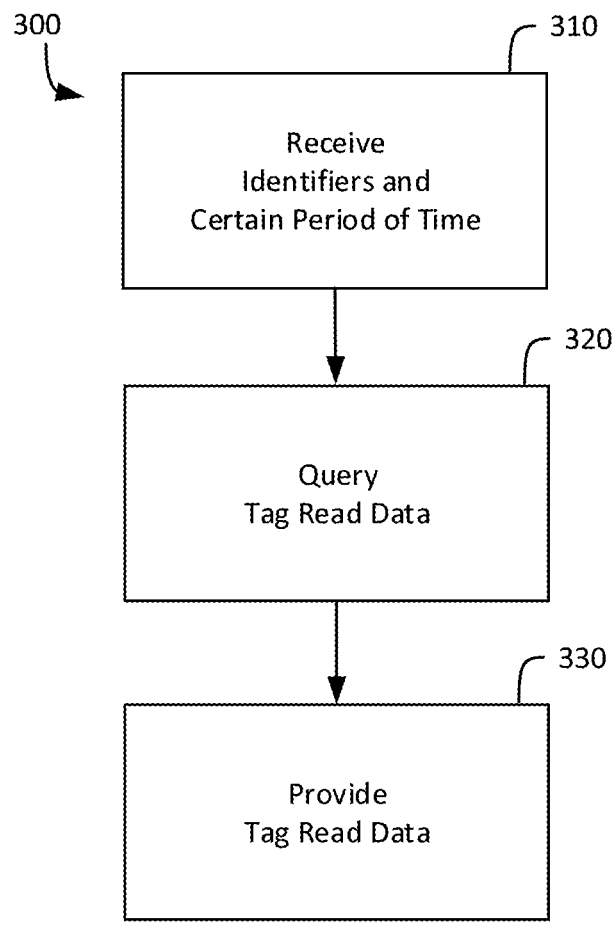
FIG. 3 depicts an example of a process for querying tag read data in accordance with various embodiments of the present disclosure.

Turning now to FIG. 3, additional details are provided regarding a data query module 130 for querying tag read data in accordance with various embodiments of the disclosure. For instance, the flow diagram shown in FIG. 3 may correspond to operations carried out, for example, by computing hardware found in the state computing system 110 as described herein, as the computing hardware executes the data query module 130.

As previously noted, in particular embodiments, the state module 120 may execute the data query module 130 to query the tag read data for a request of a predicted state of an apparatus received by the state module 120. However, additionally, or alternatively, a different module may execute the data query module 130 and/or the data query module 130 may be configured to be executed as a stand-alone module.

The process 300 involves the data query module 130 receiving identifier(s) for one or more reader devices 180 and/or one or more tags 185 at Operation 310. For example, the state module 120 may have invoked the data query module 130 and provided the data query module 130 with the reader device identifier(s) and/or tag identifier(s) associated with a request for a predicated state of an apparatus that the state module 120 has received. In addition to the reader device identifier(s) and/or the tag identifier(s), the data query module 130 may receive a certain period of time that is applicable to the request. For example, the data query module 130 may receive the certain period of time as the previous thirty seconds of time, the previous three minutes of time, the previous hour of time, and/or the like. Further, the data query module 130 may receive a state identifier that identifies the predicted state that has been requested.

At Operation 320, the data query module 130 queries tag read data the is applicable to the reader device identifier(s), the tag identifier(s), and/or the certain period of time. In particular embodiments, the data query module 130 performs this operation by querying one or more repositories 140 that store data on reads of various tags 185 performed by various reader devices 180. For example, the data query module 130 may query one or more repositories 140 that are a part of the state computing system 110. As previously noted, the various reader devices 180 may receive responses from (e.g., may read) the various tags 185 as various times when the tags 185 are present within the interrogation signals of the various reader devices 180. Accordingly, the various reader devices 180 may be in communication with the state computing system 110 over one or more networks 170, and may record the reads in the one or more repositories 140.

A read (e.g. a response received from a tag 185) generally includes data that identifies the tag 185 that was read, such as a tag identifier. In addition, the read may include data on various metrics of the read such as a signal strength value, a phase angle measurement, and/or the like. Further, the reader device 180 may record additional data along with the read such as a reader device identifier for the reader device 180 and/or a timestamp when the read occurred. Therefore, data query module 130 may query the applicable tag read data from the one or more repositories 140 based at least in part on the reader device identifier(s), tag identifier(s), and/or the certain period time that have been received.

In certain embodiments, the data query module 130 may perform one or more operations on the tag read data. In some of these embodiments, the data query module 130 may identify what operations should be performed on the tag read data based at least in part on the state identifier that has been received. For example, the data query module 130 may include data within the tag read data to identify an absence of a particular tag 185. The data query module 130 may review the tag read data and determine that the tag read data does not include any reads of a particular tag 185 for a tag identifier received. Therefore, the data query module 130 may include data (e.g., a record) for the particular tag 185 to indicate that the particular tag 185 was absent during the certain period of time.

Additionally, or alternatively, the data query module 130 may redact a portion of the tag read data. For example, the data query module 130 may redact one or more reads of a particular tag 185 to reduce the amount of data for the tag 185 found in the tag read data. As an illustrative example, the state module 120 may be determining the predicted state of an apparatus based at least in part on whether a presence of a particular tag 185 was detected during the certain period of time. In this instance, the data query module 130 may redact all of the reads of the particular tag 185 except one from the tag read data since only a single read is needed to determine that a presence of the particular tag 185 was detected during the certain period of time. The redaction may allow for the state module 120 to process the tag read data more quickly and/or more efficiently in generating the predicted state for the apparatus.

In addition, the data query module 130 may redact certain data from reads of a particular tag 185 or tags 185. As an illustrative example, the state module 120 may be determining the predicted state of an apparatus based at least in part on whether the average signal strength of the reads of a particular tag 185 satisfies a threshold. The data query module 130 may determine that the signal strength value for a particular read of the tag 185 is uncharacteristically low and is an outliner. Therefore, the data query module 130 may redact the signal strength value from the particular read or replace the signal strength value with a null so that the uncharacteristically low value is not used in determining the average signal strength of the reads. The data query module 130 may perform the same and/or similar types of redaction operations for reads involving particular reader devices 180.

Additionally, or alternatively, the data query module 130 may consolidate the reads (data thereof) for the reader device(s) 180 and/or tag(s) 185. For example, the data query module 130 may consolidate the reads for each tag 185 that provides a number of reads of the tag 185 over the certain period of time and an average, median, standard deviation, and/or the like of the signal strength values for the reads. In another example, the data query module 130 may consolidate the reads for each tag 185 with respect to each of the different reader devices 180 to include a number of reads for each combination of the tag 185 and a different reader device 180 over the certain period of time. Similar to redacting the tag read data, consolidating data for reader device(s) 180 and/or tag(s) 185 may allow for the state module 120 to process the tag read data more quickly and/or more efficiently in generating the predicted state for the apparatus.

At Operation 330, the data query module 130 provides the tag read data to the entity requesting the data. For example, the data query module 130 provides the tag read data to the state module 120. In turn, the state module 120 may then use the tag read data in generating a predicted state for an apparatus as previously described.

Example Uses

Figure 4:
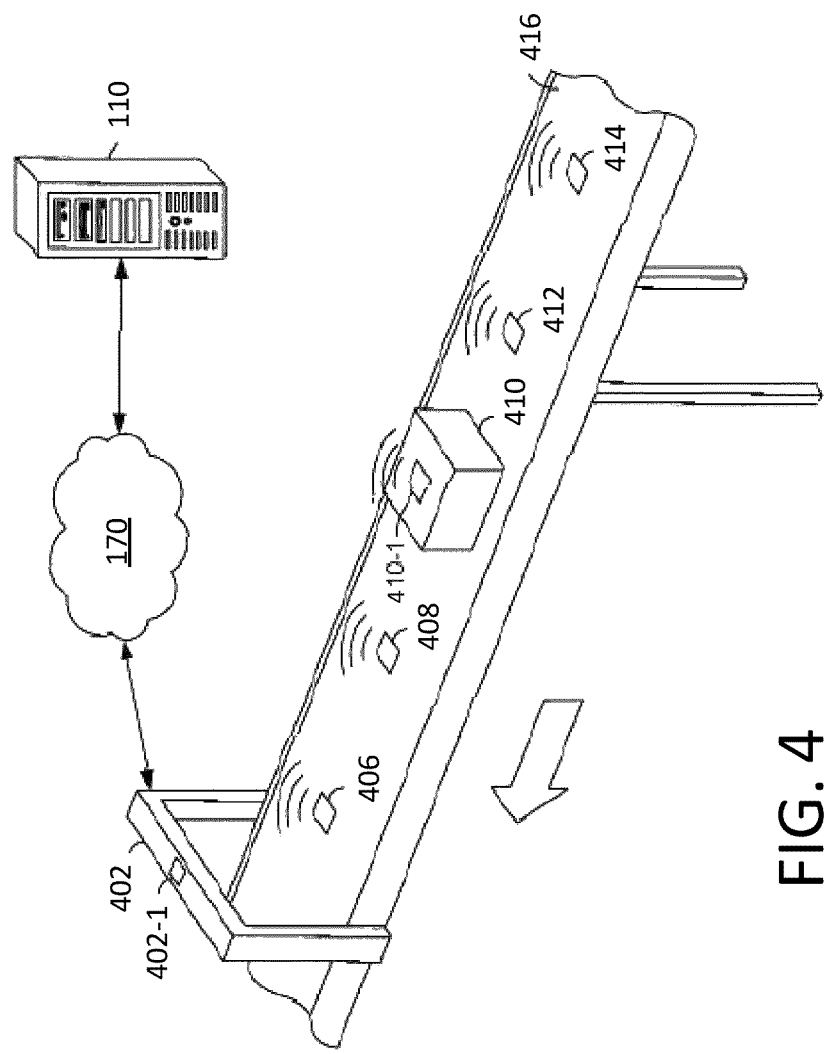
FIG. 4 is a schematic diagram of an example conveyor belt assembly in which operations of various embodiments of the present disclosure may be carried out.

FIG. 4 is a schematic diagram of an example conveyor belt assembly 416 in which operations of various embodiments of the present disclosure may be carried out. The conveyor belt assembly 416 includes a reader device 402-1 (which is embedded in a base frame 402 that supports the reader device 402-1) and various reference tags 406, 408, 412, 414. The reference tags 406, 408, 412, 414 are illustrated as being evenly spaced out along the conveyor belt surface of the conveyor belt assembly 416. An object 410, with a coupled tag 410-1, is on the conveyor belt surface. Although FIG. 4 illustrates this specific configuration, there may be alternative configurations. For example, the conveyor belt assembly 416 may only include a single reference tag, underneath or on the bottom of the conveyor belt assembly 416. The bottom may include one or more perforations in the belt portion located such that when the perforation(s) pass over the tag, the tag is visible to the reader (e.g., tag data will be passed from the tag to the reader). This may require that the belt block interrogation signals via, for example, embedded steel banding, when the reader tries to read the tag while the tag is covered by the belt portion that does not have the perforations.

FIG. 4 illustrates that conveyor belt speed can be inferred based at least in part on a time at which the reader device 402-1 reads the reference tags 406, 408, 412, 414 (or a time that the associated antenna receives the data from the reference tags 406, 408, 412, 414 or a time that some metric, such as RSSI values, satisfies a threshold). For example, at a first time, a first reference tag 406 transmits a tag identifier to the reader device 402-1 based at least in part on the reference tag 406 being within a communication range threshold of an antenna of the reader device 402-1. The reader device 402-1 transmits the read of the reference tag 406 along with the tag identifier over a computer network 170 to the state computing system 110, which then populates a repository 140 (not shown) with the read, as well as other metadata such as, for example, a timestamp indicating a date and time at which the read was received.

The same process is repeated for each of the other reference tags 408, 412, 414 as the conveyor belt travels, which causes the reference tags 408, 412, 414 to linearly move toward or under the reader device 402-1. For example, at a second time subsequent to the first time (where the first reference tag 406 is already downstream past the reader device 402-1), the second reference tag 408 transmits a tag identifier to the reader device 402-1 based at least in part on the second reference tag 408 being within the communication range threshold of the antenna of the reader device 402-1. The reader device 402-1 transmits the read of the second reference tag 408 along with the tag identifier over the computer network 170 to the state computing system 110, which then populates the repository 140 with the read, as well as other metadata such as, for example, a timestamp indicating a date and time at which the read was received.

At this point, the state computing system 110 (e.g., state module thereof 120) may query the reads as tag read data via the tag identifiers and/or corresponding timestamps to process the tag read data using a set of rules to generate a predicated state for the conveyor belt assembly 416. For example, the set of rules may include a rule that states if a difference in timestamps between reads of any two given reference tags 406, 408, 412, 414 is X, then the speed of the conveyor belt is Y, if the difference in timestamps is A, then the speed of the conveyor belt is B, else if the difference is timestamps is below a C threshold, then the speed of the conveyor belt is D. Accordingly, the state computing system 110 can infer (e.g., predict) the speed of the conveyor belt of the conveyor belt assembly 416 based at least in part on the actual differences in timestamps.

As another example, the set of rules may include a rule that if reads of a reference tag 406 are made continuously over some period of time (e.g., three second), then that the conveyor belt assembly 416 is in a state of a stoppage of the belt. Responsively, an entity operating the conveyor belt assembly 416 (e.g., a production computing system 190) may perform some operation such as, for example, causing a notification to be sent to a user device with a message that the conveyor belt assembly 416 has stopped and to investigate. Yet, as another example, the set of rules may include a rule that if the speed of the conveyor belt satisfies (e.g., is below) a threshold, then the conveyor belt assembly 416 is operating in a "too slow" state. Responsively, the entity may send a control signal to the conveyor belt assembly 416 to cause the conveyor belt assembly 416 to change its state and speed up the conveyor belt to some predefined speed.

Additionally, or alternatively, the set or rules may include rules to predict different states of the object 410 that is travelling on the conveyor belt assembly 416 based at least in part on correlating the reference tags 406, 408, 412, 414 with the coupled tag 410-1 for the object 410. For example, the set of rules may include a rule that essentially triangulates the coupled tag 410-1 in that if one or more reads of the coupled tag 410-1 have a signal strength and/or phase angle within a threshold, relative to one or more of the reference tags 406, 408, 412, 414, then the coupled tag 410-1, and corresponding object 410, is in a certain position along the conveyor belt assembly 416. As another example, the set of rules may include a rule that if reference tags 408 and 412 on opposite sides of the object 410 are read in a sequence of time, without a read of the coupled tag 410-1, then the object 410 in a state in which the object 410 has fallen off, moved, or is stuck somewhere on the conveyor belt assembly 416. Again, responsively, the entity operating the conveyor belt assembly 416 may perform some operation based at least in part on the predicted state of the object 410 to address the object 410 having fallen off, moved, or being stuck somewhere on the conveyor belt assembly 416.

In various embodiments, utilizing mechanical manipulation may create different scenarios in which a tag 185 can be used in predicting a state of an apparatus. In a first scenario, a tag 185 may be used as a "digital" signal, where the presence or absence of the tag 185, or a metric of a read of the tag exhibiting certain properties such as satisfying or not satisfying a threshold, can predict a state of an apparatus. For example, the state computing system 110 may use the presence or absence of a tag 185 to monitor the state of a bulkhead door and/or cargo doors installed on a delivery vehicle. Here, tags 185 may be installed on the inside faces of the bulkhead door and cargo doors of the delivery vehicle, with a reader device 180 installed on the inside (e.g., cargo area) of the delivery vehicle. The tag 185 installed on the bulkhead door may be hidden (absent) when the bulkhead door is slid open into the framing of the delivery vehicle and the interrogation signal of the reader device 180 is blocked by the framing. Similarly, the tag 185 installed on each of the cargo doors may be hidden (absent) when the cargo door is swung open and the tag 185 is out of the interrogation signal range of the reader device 180. Therefore, the state computing system 110 may predict a state of the bulkhead door and/or cargo doors as "open" or "closed" at a certain period of time based at least in part on whether the state computing system 110 detects a presence or an absence of the corresponding tags 185 in tag read data collected during the certain period of time by the reader device 180 installed on the inside of the delivery vehicle.

As another example, a containment (e.g., metal) box that is able to block and/or interfere with an interrogation signal may be designed to work with a vertically sliding door to predict the state of the door. When the door is open and the tag 185 is not hidden by the metal box, the tag 185 is able to be read. When the door is closed and the tag 185 is hidden by the metal box, the tag 185 is mostly, if not completely, unable to be read. Again, the state computing system 110 may predict a state of the vertically sliding door as "open" or "closed" at a certain period of time based at least in part on whether the state computing system 110 detects a presence or an absence of the tag 185 and/or a signal strength of one or more reads of the tag 185 do or do not satisfy a threshold in tag read data collected during the certain period of time.

In the door examples, the interpretation of a presence or an absence of a tag 185 can be used through mechanical manipulation to replace various sensor technologies such as magnets, photo eyes, and other types of electronic door sensor technology to detect a state of the door as being either open or closed. Whether to use the presence of a tag 185 as signaling the state of the door is open or closed and the absence of the tag 185 as signaling the state of the door is open or closed may be determined by the environment where the tag 185 is installed. For example, in the case of a bulkhead door that operations as a pocket style door, the tag 185 can be naturally hidden by the framing of the delivery vehicle. While in the case of a vertically sliding door, the tag 185 may require a containment box to manipulate the readable state of the tag 185.

In a second scenario, a tag 185 may be used as an "analog" signal, where the periodic nature of the presence of a tag 185 can predict a state of an apparatus. For example, the state computing system 110 may be able to use the periodic nature of a presence of a tag 185 to predict belt speed. Here, perforations may be provided in the belt at different intervals that allow for the tag 185 to be periodically read as the perforations pass over the tag 185, creating a shuttering effect. Accordingly, the state computing system 110 may apply a set of rules to analyze the timing of the shuttering and read rates of the tag 185 to predict a belt speed. As another example, a tag 185 may be coupled to a motor shaft and the signal strength (e.g., RSSI values) of reads of the tag 185 as the tag 185 rotates on the shaft are recorded. The state computing system 110 may apply a set of rules to the signal strength to interpret the distance of the tag 185 to an antenna of a reader device 180 to determine the revolutions of the motor shaft and predict the speed of the motor shaft.

In a third scenario, a tag 185 may be may be used as both a digital and an analog signal. For example, an entity may use both the presence and signal strength (e.g., RSSI values) of a tag 185 coupled to an apparatus, such as a package, to track the transfer of the apparatus between equipment, such as delivery vehicles. The state computing system 110 may evaluate, via a set of rules, that the presence of the tag 185 coupled to the package, known to be stored in a first delivery vehicle, has been detected by a reader device 180 associated with a second delivery vehicle provides a predicted state that the two delivery vehicles are in close proximity of each other. In addition, the state computing system 110 may use the set of rules, or another set of rules, to evaluate that reads of the tag 185 coupled to the package displaying drastically different phase angles and/or RSSI values provides a predicted state that the package is in motion and is being transferred from the first delivery vehicle to the second delivery vehicle.

Example Technical Platforms

Embodiments of the disclosure may utilize various components such as computing systems and/or devices, storage devices, and/or the like, in performing various operations. Accordingly, these components involved in embodiments of the present disclosure may perform instructions that are implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various embodiments are described to use a computer-readable storage medium, other types of computer-readable storage media may be substituted for or used in addition to the computer-readable storage media described above.

Various embodiments of the present disclosure, and/or components thereof and/or that are utilized, may also be implemented as methods, apparatus, systems, computing devices, computing entities, and/or the like. As such, various embodiments of the present disclosure, and/or components thereof and/or that are utilized, may take the form of a data structure, apparatus, system, computing device, computing entity, and/or the like executing instructions stored on a computer-readable storage medium to perform certain steps or operations. Thus, various embodiments of the present disclosure, and/or components thereof and/or that are utilized, also may take the form of entirely hardware, entirely computer program product, and/or a combination of computer program product and hardware performing certain steps or operations.

Various embodiments of the present disclosure, and/or components thereof and/or that are utilized, are described herein with reference to block diagrams and flowchart illustrations. Thus, each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some examples of embodiments, retrieval, loading, and/or execution may be performed in parallel such that multiple instructions are retrieved, loaded, and/or executed together. Thus, such embodiments can produce specially configured machines performing the steps or operations specified in the block diagrams and flowchart illustrations. Accordingly, the block diagrams and flowchart illustrations support various combinations of embodiments for performing the specified instructions, operations, or steps.

Example System Architecture

Figure 5:
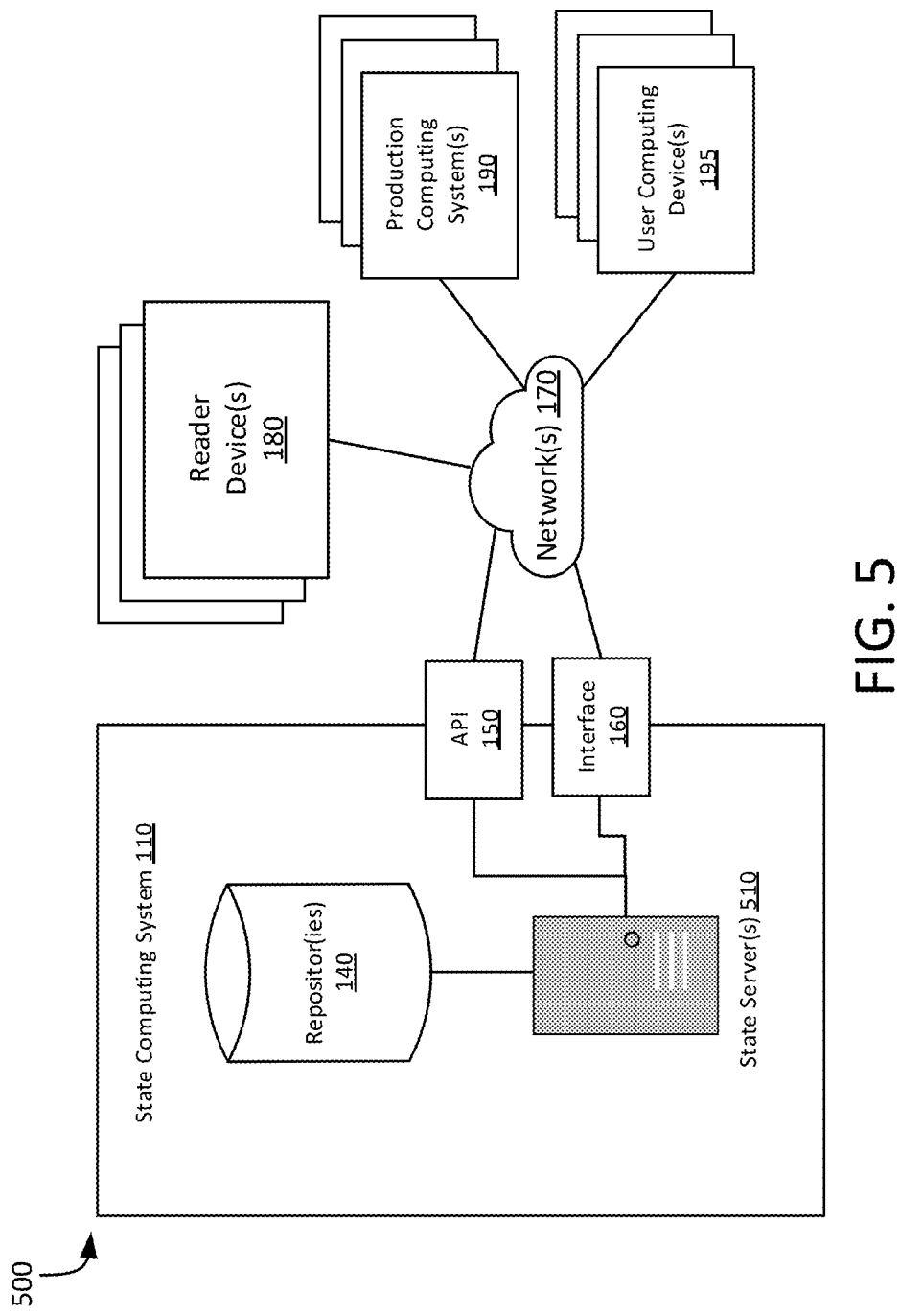
FIG. 5 depicts an example of a computing architecture that may be used in accordance with various embodiments of the present disclosure.

FIG. 5 is a block diagram of a system architecture 500 that can be used in in using tag-reader-based technologies for generating and providing predicted states for apparatus according to various embodiments of the disclosure as detailed herein. Components of the system architecture 500 are configured according to various embodiments to provide functionality configured to use tag-reader-based technologies in generating and providing predicted states for apparatus through a service. As may be understood from FIG. 5, the system architecture 500 in various embodiments may include a state computing system 110 that comprises one or more state servers 510 and one or more data repositories 140 to facilitate such functionality.

In particular embodiments, the one or more state servers 510 and repositories 140 are used as processing capacity and storage in supporting the service for providing predicted states of apparatus. For example, the one or more state servers 510 may execute a state module 120 and/or data query module 130 as described herein in providing functionality for the service. In addition, the one or more data repositories 140 may be used for storing programs, data, and/or the like used in supporting the service. For example, the one or more data repositories 140 may be used for storing one or more sets of rules that are used in evaluating tag read data in predicting states of apparatus.

The one or more state servers 510 may be in communication with one or more production computing systems 190, as well as one or more user computing devices 195, over one or more networks 170 (e.g., the Internet, cellular, intranet, and/or the like). Accordingly, the state server(s) 510 may be in communication over the network(s) 170 with components residing on the production computing systems 190 and/or with the user computing devices 195 to facilitate various functionality as described herein. To do so, the state server(s) 510 may interface with the production computing systems 190 via one or more suitable application programming interfaces (APIs) 150, direct connections, and/or the like. In addition, the state server(s) 510 may interface with the user computing devices 195 via an interface 160 such as, for example, a Web application, mobile application, and/or the like.

In some embodiments, the one or more state servers 510 may be in communication with one or more reader devices 180 that provide tag read data from reading tags 185 as detailed herein. The state server(s) 510 may be in communication over the network(s) 170 with the reader device(s) 180 via one or more APIs 150, direct connections, and/or the like. In addition, the state server(s) 510 may store the tag read data in the repository(ies) 140, as well as use the tag read data in generating predicted states of apparatus. In additional or alternative embodiments, the reader device(s) 180 may be in communication with the repository(ies) 140 and store the tag read data directly in the repository(ies) 140. Although the state server(s) 510 and data repository(ies) 140 for the state computing system 110 are shown as separate components, it should be understood that according to other embodiments, these components 510, 140 may comprise a single server and/or repository, a plurality of servers and/or repositories, or any other suitable configuration.

Example Computing Hardware

Figure 6:
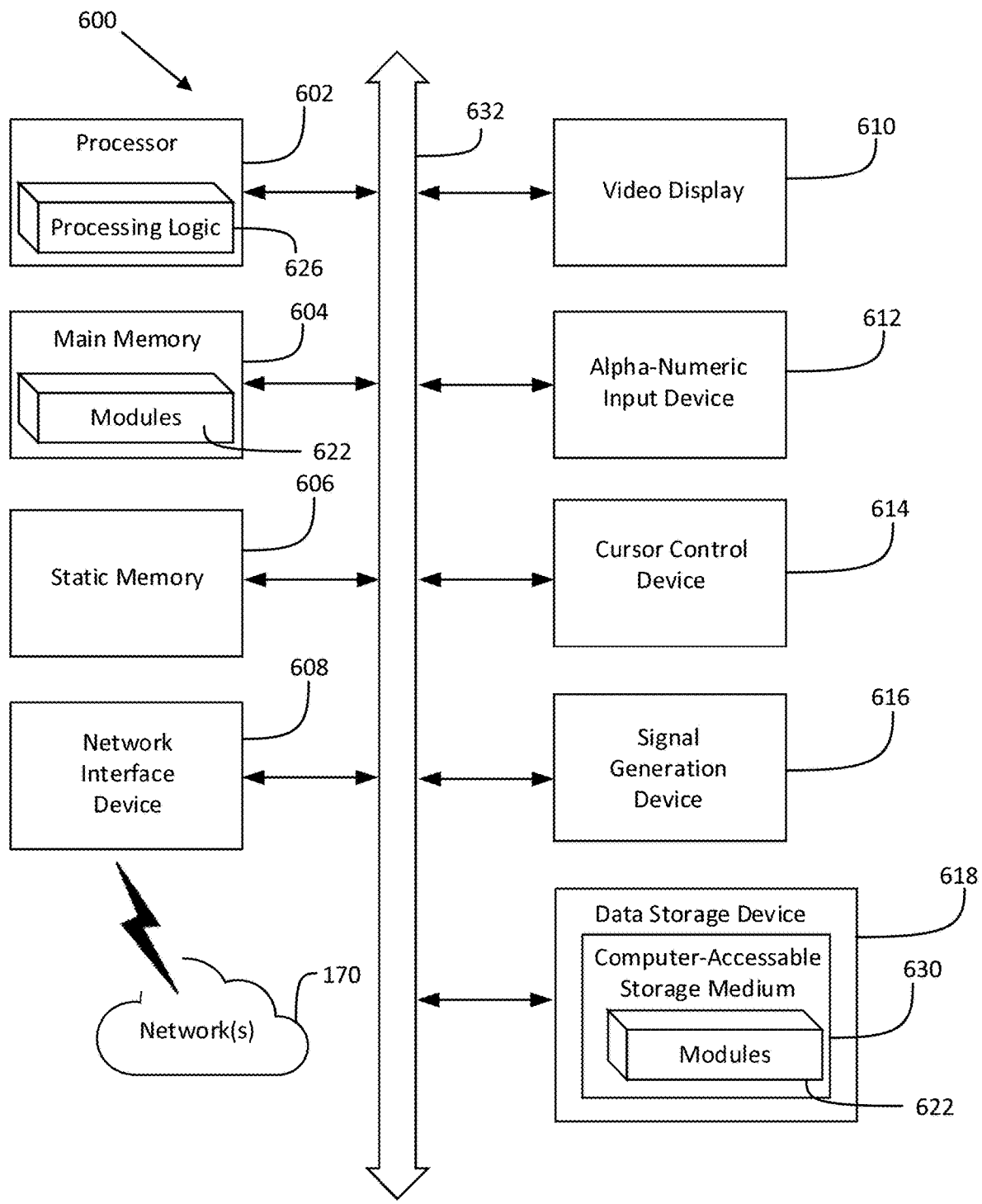
FIG. 6 depicts an example of computing hardware suitable for supporting the operation of various embodiments of the present disclosure.

FIG. 6 illustrates a diagrammatic representation of an example of computing hardware 600 that can be used within the system architecture 500. For example, the computing hardware 600 may be a server 510 as described in FIG. 5, server found within a production computing system 190, and/or a user computing device 195. In various embodiments, the computing hardware 600 may be connected (e.g., networked) to other computing hardware via a wireless network, a LAN, an intranet, an extranet, and/or the Internet. The computing hardware 600 may operate in the capacity of a server, a client computer in a client-server network environment, a peer computer in a peer-to-peer (or distributed) network environment, and/or the like. The computing hardware 600 may be, for example, a desktop personal computer (PC), a tablet PC, a set-top box (STB), a Personal Digital Assistant (PDA), a cellular telephone, a web appliance, a server, a network router, a switch or bridge, or any other computing hardware capable of executing a set of instructions (sequential or otherwise) that specify actions to be taken by the computing hardware 600. Further, while the computing hardware 600 is shown as a single computing entity in FIG. 6, the term "computing hardware" shall also be taken to include any collection of computing entities that individually or jointly execute a set (or multiple sets) of instructions to perform any one or more of the methodologies/functionalities described herein.

The computing hardware 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 632.

The processing device 602 represents one or more general-purpose processing devices such as a microprocessor, a central processing unit, and/or the like. More particularly, the processing device 602 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 may be configured to execute processing logic 626 for performing various operations, steps, and/or the like as discussed herein.

The computing hardware 600 may further include a network interface device 608. The computing hardware 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a non-transitory computer-accessible storage medium 630 (also known as a non-transitory computer-readable storage medium or a non-transitory computer-readable medium) on which is stored one or more modules 622 (e.g., sets of instructions) as described herein. The modules 622 may also reside, completely or at least partially, within the main memory 604 and/or within the processing device 602 during execution thereof by the computing hardware 600. In this capacity, the main memory 604 and the processing device 602 can also constitute computer-accessible storage media. The modules 622 may further be transmitted or received over one or more networks 170 via a network interface device 608.

While the computer-accessible storage medium 630 is shown in FIG. 6 to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a module (e.g., a set of instructions) for execution by the computing hardware 600 and that cause the computing hardware 600 to perform any one or more of the methodologies/functionalities of the present disclosure. The term "computer-accessible storage medium" should accordingly be understood to include, but not be limited to, solid-state memories, optical and magnetic media, etc.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

Embodiment 1: A method comprising: receiving, by computing hardware, a request for a predicted state of an apparatus, wherein the request includes an apparatus identifier for the apparatus and a state identifier for the predicted state; identifying, by the computing hardware and based at least in part on the apparatus identifier and the state identifier, a reader device identifier and a tag identifier associated with the apparatus; querying, by the computing hardware and based at least in part on the reader device identifier and the tag identifier, tag read data, wherein the tag read data involves a reader device associated with the reader device identifier at least one of reading or not reading a tag associated with the tag identifier during a certain period of time; identifying, by the computing hardware and based at least in part on the state identifier, a set of rules, wherein the set of rules defines one or more predefined read characteristics associated with the reader device at least one of reading or not reading the tag that correspond to expected behavior for the apparatus; generating, by the computing hardware processing the tag read data using the set of rules, the predicted state of the apparatus; and communicating, by the computing hardware, the predicted state to at least one of a user computing device or a production computing system.

Embodiment 2: the method of embodiment 1, wherein the one or more predefined read characteristics involve at least one of a presence or an absence of the tag during the certain period of time.

Embodiment 3: the method of embodiment 1 or 2, wherein the one or more predefined read characteristics involve a metric associated with reading the tag during the certain period of time satisfying a threshold.

Embodiment 4: the method of any of embodiments 1 to 3, wherein the production computing system, responsive to receiving the predicted state, performs an operation involving the apparatus that causes a change of state of the apparatus.

Embodiment 5: the method of any of embodiments 1 to 4, further comprising: identifying, by the computing hardware and based at least in part on the apparatus identifier and the state identifier, a second tag identifier associated with the apparatus; and querying, by the computing hardware and based at least in part on the reader device identifier and the second tag identifier, second tag read data, wherein: the second tag read data involves the reader device at least one of reading or not reading a second tag associated with the second tag identifier during the certain period of time, the one or more predefined read characteristics are also associated with the reader device at least one of reading or not reading the second tag that correspond to the expected behavior for the apparatus, and generating the predicted state of the apparatus also involves the computing hardware processing the second tag read data using the set of rules.

Embodiment 6: the method of any of embodiments 1 to 4, further comprising: identifying, by the computing hardware and based at least in part on the apparatus identifier and the state identifier, a second reader device identifier associated with the apparatus; and querying, by the computing hardware and based at least in part on the second reader device identifier and the tag identifier, second tag read data, wherein: the second tag read data involves a second reader device associated with the second reader device identifier at least one of reading or not reading the tag during the certain period of time, the one or more predefined read characteristics are also associated with the second reader device at least one of reading or not reading the tag that correspond to the expected behavior for the apparatus, and generating the predicted state of the apparatus also involves the computing hardware processing the second tag read data using the set of rules.

Embodiment 7: the method of any of embodiments 1 to 4, further comprising: identifying, by the computing hardware and based at least in part on the apparatus identifier and the state identifier, a second reader device identifier and a second tag identifier associated with the apparatus; and querying, by the computing hardware and based at least in part on the second reader device identifier and the second tag identifier, second tag read data, wherein: the second tag read data involves a second reader device associated with the second reader device identifier at least one of reading or not reading a second tag associated with the second tag identifier during the certain period of time, the one or more predefined read characteristics are also associated with the second reader device at least one of reading or not reading the second tag that correspond to the expected behavior for the apparatus, and generating the predicted state of the apparatus also involves the computing hardware processing the second tag read data using the set of rules.

Embodiment 8: a system comprising: a non-transitory computer-readable medium storing instructions; and a processing device communicatively coupled to the non-transitory computer-readable medium, wherein the processing device is configured to execute the instructions and thereby perform operations comprising: receiving a request for a predicted state of an apparatus, wherein the request includes an apparatus identifier for the apparatus; identifying, based at least in part on the apparatus identifier, a reader device identifier and a tag identifier associated with the apparatus; querying, based at least in part on the reader device identifier and the tag identifier, tag read data, wherein the tag read data involves a reader device associated with the reader device identifier at least one of reading or not reading a tag associated with the tag identifier during a certain period of time; identifying a set of rules, wherein the set of rules defines one or more predefined read characteristics associated with the reader device at least one of reading or not reading the tag that correspond to expected behavior for the apparatus; processing the tag read data using the set of rules to generate the predicted state of the apparatus; and communicating the predicted state to at least one of a user computing device or a production computing system.

Embodiment 9: the system of embodiment 8, wherein the one or more predefined read characteristics involve at least one of a presence or an absence of the tag during the certain period of time.

Embodiment 10: the system of embodiment 8 or 9, wherein the one or more predefined read characteristics involve a metric associated with reading the tag during the certain period of time satisfying a threshold.

Embodiment 11: the system of any of embodiments 8 to 10, wherein the production computing system, responsive to receiving the predicted state, performs an operation involving the apparatus that causes a change of state of the apparatus.

Embodiment 12: the system of any of embodiments 8 to 11, wherein the operations further comprise: identifying, based at least in part on the apparatus identifier, a second tag identifier associated with the apparatus; and querying, based at least in part on the reader device identifier and the second tag identifier, second tag read data, wherein: the second tag read data involves the reader device at least one of reading or not reading a second tag associated with the second tag identifier during the certain period of time, the one or more predefined read characteristics are also associated with the reader device at least one of reading or not reading the second tag that correspond to the expected behavior for the apparatus, and generating the predicted state of the apparatus also involves processing the second tag read data using the set of rules.

Embodiment 13: the system of any of embodiments 8 to 11, wherein the operations further comprise: identifying, based at least in part on the apparatus identifier, a second reader device identifier associated with the apparatus; and querying, based at least in part on the second reader device identifier and the tag identifier, second tag read data, wherein: the second tag read data involves a second reader device associated with the second reader device identifier at least one of reading or not reading the tag during the certain period of time, the one or more predefined read characteristics are also associated with the second reader device at least one of reading or not reading the tag that correspond to the expected behavior for the apparatus, and generating the predicted state of the apparatus also involves processing the second tag read data using the set of rules.

Embodiment 14: the system of any of embodiments 8 to 11, wherein the operations further comprise: identifying, based at least in part on the apparatus identifier, a second reader device identifier and a second tag identifier associated with the apparatus; and querying, based at least in part on the second reader device identifier and the second tag identifier, second tag read data, wherein: the second tag read data involves a second reader device associated with the second reader device identifier at least one of reading or not reading a second tag associated with the second tag identifier during the certain period of time, the one or more predefined read characteristics are also associated with the second reader device at least one of reading or not reading the second tag that correspond to the expected behavior for the apparatus, and generating the predicted state of the apparatus also involves processing the second tag read data using the set of rules.

Embodiment 15: a non-transitory computer-readable medium storing computer-executable instructions that, when executed by computing hardware, configure the computing hardware to perform operations comprising: receiving a request for a predicted state of an apparatus, wherein the request includes an apparatus identifier for the apparatus; identifying, based at least in part on the apparatus identifier, a tag identifier associated with the apparatus; querying, based at least in part on the tag identifier, tag read data, wherein the tag read data involves a reader device at least one of reading or not reading a tag associated with the tag identifier during a certain period of time; processing the tag read data using a set of rules to generate the predicted state of the apparatus, wherein the set of rules defines one or more predefined read characteristics associated with the reader device at least one of reading or not reading the tag that correspond to expected behavior for the apparatus; and communicating the predicted state to at least one of a user computing device or a production computing system.

Embodiment 16: the non-transitory computer-readable medium of embodiment 15, wherein the one or more predefined read characteristics involve at least one of a presence or an absence of the tag during the certain period of time.

Embodiment 17: the non-transitory computer-readable medium of embodiment 15 or 16, wherein the one or more predefined read characteristics involve a metric associated with reading the tag during the certain period of time satisfying a threshold.

Embodiment 18: the non-transitory computer-readable medium of any of embodiments 15 to 17, wherein the production computing system, responsive to receiving the predicted state, performs an operation involving the apparatus that causes a change of state of the apparatus.

Embodiment 19: the non-transitory computer-readable medium of any of embodiments 15 to 18, wherein the operations further comprise: identifying, based at least in part on the apparatus identifier, a second tag identifier associated with the apparatus; and querying, based at least in part on the second tag identifier, second tag read data, wherein: the second tag read data involves the reader device at least one of reading or not reading a second tag associated with the second tag identifier during the certain period of time, the one or more predefined read characteristics are also associated with the reader device at least one of reading or not reading the second tag that correspond to the expected behavior for the apparatus, and generating the predicted state of the apparatus also involves processing the second tag read data using the set of rules.

Embodiment 20: the non-transitory computer-readable medium of any of embodiments 15 to 18, wherein the operations further comprise querying, based at least in part on the tag identifier, second tag read data, wherein: the second tag read data involves a second reader device at least one of reading or not reading the tag during the certain period of time, the one or more predefined read characteristics are also associated with the second reader device at least one of reading or not reading the tag that correspond to the expected behavior for the apparatus, and generating the predicted state of the apparatus also involves processing the second tag read data using the set of rules.

CONCLUSION

While this specification contains many specific aspect details, these should not be construed as limitations on the scope of any invention or of what may be claimed, but rather as descriptions of features that may be specific to particular embodiments of particular inventions. Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various embodiments described above should not be understood as requiring such separation in all embodiments, and the described program components (e.g., modules) and systems may be integrated together in a single software product or packaged into multiple software products.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for the purposes of limitation.

In some embodiments, this disclosure may include the language "at least one of [element A] or [element B]." This language may refer to one or more of the elements. For example, "at least one of A or B" may refer to "A," "B," or "A and B." In other words, "at least one of A or B" may refer to "at least one of A and at least one of B," "at least one of A or B," or "A and B." In some embodiments, this disclosure may include the language, for example "[element A], [element B], and/or [element C]." This language may refer to either of the element or any combination thereof. In other words, "A, B, and/or C" may refer to "A," "B," "C," "A and B," "A and C," "B and C," or "A, B, and C."

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. A method comprising:
receiving, by computing hardware, a request for a predicted state of an apparatus, wherein the request includes an apparatus identifier for the apparatus and a state identifier for the predicted state;
identifying, by the computing hardware and based at least in part on the apparatus identifier and the state identifier, a reader device identifier and a tag identifier associated with the apparatus;
querying, by the computing hardware and based at least in part on the reader device identifier and the tag identifier, tag read data, wherein the tag read data involves a reader device associated with the reader device identifier at least one of reading or not reading a tag associated with the tag identifier during a certain period of time;
identifying, by the computing hardware and based at least in part on the state identifier, a set of rules, wherein the set of rules defines one or more predefined read characteristics associated with the reader device at least one of reading or not reading the tag that correspond to expected behavior for the apparatus;
generating, by the computing hardware processing the tag read data using the set of rules, the predicted state of the apparatus; and
communicating, by the computing hardware, the predicted state to at least one of a user computing device or a production computing system.

2. The method of claim 1, wherein the one or more predefined read characteristics involve at least one of a presence or an absence of the tag during the certain period of time.

3. The method of claim 1, wherein the one or more predefined read characteristics involve a metric associated with reading the tag during the certain period of time satisfying a threshold.

4. The method of claim 1, wherein the production computing system, responsive to receiving the predicted state, performs an operation involving the apparatus that causes a change of state of the apparatus.

5. The method of claim 1, further comprising:
identifying, by the computing hardware and based at least in part on the apparatus identifier and the state identifier, a second tag identifier associated with the apparatus; and
querying, by the computing hardware and based at least in part on the reader device identifier and the second tag identifier, second tag read data, wherein:
the second tag read data involves the reader device at least one of reading or not reading a second tag associated with the second tag identifier during the certain period of time,
the one or more predefined read characteristics are also associated with the reader device at least one of reading or not reading the second tag that correspond to the expected behavior for the apparatus, and
generating the predicted state of the apparatus also involves the computing hardware processing the second tag read data using the set of rules.

6. The method of claim 1, further comprising:
identifying, by the computing hardware and based at least in part on the apparatus identifier and the state identifier, a second reader device identifier associated with the apparatus; and
querying, by the computing hardware and based at least in part on the second reader device identifier and the tag identifier, second tag read data, wherein:
the second tag read data involves a second reader device associated with the second reader device identifier at least one of reading or not reading the tag during the certain period of time,
the one or more predefined read characteristics are also associated with the second reader device at least one of reading or not reading the tag that correspond to the expected behavior for the apparatus, and
generating the predicted state of the apparatus also involves the computing hardware processing the second tag read data using the set of rules.

7. The method of claim 1, further comprising:
identifying, by the computing hardware and based at least in part on the apparatus identifier and the state identifier, a second reader device identifier and a second tag identifier associated with the apparatus; and
querying, by the computing hardware and based at least in part on the second reader device identifier and the second tag identifier, second tag read data, wherein:
the second tag read data involves a second reader device associated with the second reader device identifier at least one of reading or not reading a second tag associated with the second tag identifier during the certain period of time,
the one or more predefined read characteristics are also associated with the second reader device at least one of reading or not reading the second tag that correspond to the expected behavior for the apparatus, and
generating the predicted state of the apparatus also involves the computing hardware processing the second tag read data using the set of rules.

8. A system comprising:
a non-transitory computer-readable medium storing instructions; and
a processing device communicatively coupled to the non-transitory computer-readable medium, wherein the processing device is configured to execute the instructions and thereby perform operations comprising:
receiving a request for a predicted state of an apparatus, wherein the request includes an apparatus identifier for the apparatus;
identifying, based at least in part on the apparatus identifier, a reader device identifier and a tag identifier associated with the apparatus;
querying, based at least in part on the reader device identifier and the tag identifier, tag read data, wherein the tag read data involves a reader device associated with the reader device identifier at least one of reading or not reading a tag associated with the tag identifier during a certain period of time;
identifying a set of rules, wherein the set of rules defines one or more predefined read characteristics associated with the reader device at least one of reading or not reading the tag that correspond to expected behavior for the apparatus;
processing the tag read data using the set of rules to generate the predicted state of the apparatus; and
communicating the predicted state to at least one of a user computing device or a production computing system.

9. The system of claim 8, wherein the one or more predefined read characteristics involve at least one of a presence or an absence of the tag during the certain period of time.

10. The system of claim 8, wherein the one or more predefined read characteristics involve a metric associated with reading the tag during the certain period of time satisfying a threshold.

11. The system of claim 8, wherein the production computing system, responsive to receiving the predicted state, performs an operation involving the apparatus that causes a change of state of the apparatus.

12. The system of claim 8, wherein the operations further comprise:
identifying, based at least in part on the apparatus identifier, a second tag identifier associated with the apparatus; and
querying, based at least in part on the reader device identifier and the second tag identifier, second tag read data, wherein:
the second tag read data involves the reader device at least one of reading or not reading a second tag associated with the second tag identifier during the certain period of time,
the one or more predefined read characteristics are also associated with the reader device at least one of reading or not reading the second tag that correspond to the expected behavior for the apparatus, and
generating the predicted state of the apparatus also involves processing the second tag read data using the set of rules.

13. The system of claim 8, wherein the operations further comprise:
identifying, based at least in part on the apparatus identifier, a second reader device identifier associated with the apparatus; and
querying, based at least in part on the second reader device identifier and the tag identifier, second tag read data, wherein:
the second tag read data involves a second reader device associated with the second reader device identifier at least one of reading or not reading the tag during the certain period of time,
the one or more predefined read characteristics are also associated with the second reader device at least one of reading or not reading the tag that correspond to the expected behavior for the apparatus, and
generating the predicted state of the apparatus also involves processing the second tag read data using the set of rules.

14. The system of claim 8, wherein the operations further comprise:
identifying, based at least in part on the apparatus identifier, a second reader device identifier and a second tag identifier associated with the apparatus; and
querying, based at least in part on the second reader device identifier and the second tag identifier, second tag read data, wherein:
the second tag read data involves a second reader device associated with the second reader device identifier at least one of reading or not reading a second tag associated with the second tag identifier during the certain period of time,
the one or more predefined read characteristics are also associated with the second reader device at least one of reading or not reading the second tag that correspond to the expected behavior for the apparatus, and
generating the predicted state of the apparatus also involves processing the second tag read data using the set of rules.

15. A non-transitory computer-readable medium storing computer-executable instructions that, when executed by computing hardware, configure the computing hardware to perform operations comprising:
receiving a request for a predicted state of an apparatus, wherein the request includes an apparatus identifier for the apparatus;
identifying, based at least in part on the apparatus identifier, a tag identifier associated with the apparatus;
querying, based at least in part on the tag identifier, tag read data, wherein the tag read data involves a reader device at least one of reading or not reading a tag associated with the tag identifier during a certain period of time;
processing the tag read data using a set of rules to generate the predicted state of the apparatus, wherein the set of rules defines one or more predefined read characteristics associated with the reader device at least one of reading or not reading the tag that correspond to expected behavior for the apparatus; and
communicating the predicted state to at least one of a user computing device or a production computing system.

16. The non-transitory computer-readable medium of claim 15, wherein the one or more predefined read characteristics involve at least one of a presence or an absence of the tag during the certain period of time.

17. The non-transitory computer-readable medium of claim 15, wherein the one or more predefined read characteristics involve a metric associated with reading the tag during the certain period of time satisfying a threshold.

18. The non-transitory computer-readable medium of claim 15, wherein the production computing system, responsive to receiving the predicted state, performs an operation involving the apparatus that causes a change of state of the apparatus.

19. The non-transitory computer-readable medium of claim 15, wherein the operations further comprise:
identifying, based at least in part on the apparatus identifier, a second tag identifier associated with the apparatus; and
querying, based at least in part on the second tag identifier, second tag read data, wherein:
the second tag read data involves the reader device at least one of reading or not reading a second tag associated with the second tag identifier during the certain period of time,
the one or more predefined read characteristics are also associated with the reader device at least one of reading or not reading the second tag that correspond to the expected behavior for the apparatus, and
generating the predicted state of the apparatus also involves processing the second tag read data using the set of rules.

20. The non-transitory computer-readable medium of claim 15, wherein the operations further comprise querying, based at least in part on the tag identifier, second tag read data, wherein:
the second tag read data involves a second reader device at least one of reading or not reading the tag during the certain period of time,
the one or more predefined read characteristics are also associated with the second reader device at least one of reading or not reading the tag that correspond to the expected behavior for the apparatus, and generating the predicted state of the apparatus also involves processing the second tag read data using the set of rules.

\* \* \* \* \*